US012699417B2

(12) United States Patent
Godfrey

(10) Patent No.: US 12,699,417 B2
(45) Date of Patent: Aug. 4, 2026

(54) MOBILE ALL-IN-ONE DEVICE

(71) Applicant: Lenovo (Singapore) Pte. Ltd.,
Singapore (SG)

(72) Inventor: Cyan Godfrey, Chapel Hill, NC (US)

(73) Assignee: Lenovo (Singapore) Pte. Ltd.,
Singapore (SG)

( * ) Notice: Subject to any disclaimer, the term of this
patent is extended or adjusted under 35
U.S.C. 154(b) by 84 days.

(21) Appl. No.: 18/758,698

(22) Filed: Jun. 28, 2024

(65) Prior Publication Data

US 2026/0003391 A1 Jan. 1, 2026

(51) Int. Cl.
*G06F 1/16* (2006.01)
*G06F 1/18* (2026.01)
*H01R 12/70* (2011.01)

(52) U.S. Cl.
CPC ............ *G06F 1/1601* (2013.01); *G06F 1/181*
(2013.01); *H01R 12/7076* (2013.01)

(58) Field of Classification Search
CPC ...... G06F 1/1601; G06F 1/1632; G06F 1/181;
H01R 12/7076
See application file for complete search history.

(56) References Cited

U.S. PATENT DOCUMENTS

| | | | | | |
|---|---|---|---|---|---|
| 6,823,415 | B1 * | 11/2004 | Asaad | ................... | G06F 1/1632 |
| | | | | | 710/303 |
| 7,471,511 | B2 * | 12/2008 | Montag | ................ | G06F 1/1632 |
| | | | | | 348/730 |
| 8,704,772 | B2 * | 4/2014 | Bennett | ............... | G06F 3/04883 |
| | | | | | 345/169 |
| 9,336,190 | B2 * | 5/2016 | Bennett | ................... | G06F 3/048 |
| 9,785,626 | B2 * | 10/2017 | Bennett | ................... | G06F 3/048 |
| 9,880,586 | B2 * | 1/2018 | Ent | ........................ | G06F 1/1632 |
| 10,443,781 | B2 * | 10/2019 | Truong | ................ | G09F 9/3026 |
| 10,452,096 | B1 * | 10/2019 | Keilers | ................. | F16M 11/22 |
| 10,955,873 | B1 * | 3/2021 | Godfrey | ............... | G06F 1/1607 |
| 10,996,714 | B1 * | 5/2021 | Godfrey | ............... | G06F 1/1601 |
| 11,023,000 | B2 * | 6/2021 | Keilers | .................... | G06F 1/16 |
| 11,507,133 | B2 * | 11/2022 | Keilers | ................... | G06F 1/181 |
| 11,528,820 | B2 * | 12/2022 | Wang | .................... | F16M 13/04 |
| 11,570,917 | B2 * | 1/2023 | Bustamante | .......... | G06F 1/1632 |
| 11,690,187 | B2 * | 6/2023 | Wallace | ............... | G06F 1/1632 |
| | | | | | 361/679.02 |
| 11,822,383 | B2 * | 11/2023 | Chen | ..................... | G06F 1/1601 |
| 11,844,183 | B2 * | 12/2023 | Wang | .................... | F16M 11/10 |
| 2007/0168593 | A1 * | 7/2007 | Montag | ................. | G06F 1/1632 |
| | | | | | 710/303 |
| 2009/0079665 | A1 * | 3/2009 | Moscovitch | ........... | F16M 11/10 |
| | | | | | 345/1.3 |
| 2010/0013675 | A1 * | 1/2010 | Bennett | .............. | G06F 13/4004 |
| | | | | | 341/5 |
| 2014/0225834 | A1 * | 8/2014 | Bennett | ................. | G06F 1/1632 |
| | | | | | 345/169 |
| 2016/0253302 | A1 * | 9/2016 | Bennett | ................ | G06V 30/224 |
| | | | | | 345/168 |

(Continued)

*Primary Examiner* — Michael Pervan
(74) *Attorney, Agent, or Firm* — FERENCE &
ASSOCIATES LLC

(57) ABSTRACT

One embodiment provides a device, including: a display
including a stand including electrical connections; and a
base including a memory device, a processor, and a power
source; wherein the base is electrically couplable to the
display via at least the electrical connections. Other aspects
are claimed and described.

19 Claims, 7 Drawing Sheets

(56)         References Cited

U.S. PATENT DOCUMENTS

| | | | |
|---|---|---|---|
| 2017/0227986 A1* | 8/2017 | Ent | F16M 11/08 |
| 2017/0231102 A1* | 8/2017 | Truong | F16M 13/00 |
| 2020/0050234 A1* | 2/2020 | Keilers | G06F 1/16 |
| 2021/0132656 A1* | 5/2021 | Godfrey | G06F 1/1607 |
| 2021/0263553 A1* | 8/2021 | Keilers | G06F 1/1601 |
| 2021/0289645 A1* | 9/2021 | Wang | H05K 5/023 |
| 2022/0100228 A1* | 3/2022 | Chen | G06F 1/1684 |
| 2022/0110218 A1* | 4/2022 | Bustamante | H05K 5/0247 |
| 2022/0316648 A1* | 10/2022 | Wallace | G06F 1/1626 |
| 2023/0088181 A1* | 3/2023 | Wang | F16M 13/04 |
| | | | 361/679.41 |
| 2023/0141332 A1* | 5/2023 | Zhao | G06F 1/1626 |
| | | | 455/575.1 |
| 2024/0081009 A1* | 3/2024 | Wang | G06F 1/1626 |

* cited by examiner

MOBILE ALL-IN-ONE DEVICE

BACKGROUND

As information handling devices become more compact, transporting a device and/or traveling with a device has become much easier. A user can utilize an information handling device for work in a variety of locations because of this ease of transport. Rather than being restricted to a single location, as with the use of traditional, stationary, information handling devices, a more compact and inclusive device permits a user to move about an environment in more ways than one. For example, a user that commonly works from a location in their home may travel, with their device, to a library, a coffee shop, shared workspace, and/or the like, and work from different locations. This increased use of compact devices has allowed for a more modern approach to utilizing what was previously a stationary device. However, as convenience for transport increases, changes in information handling device components, specifically, a size of these components, suffers, resulting in new challenges for a user utilizing these compact devices.

BRIEF SUMMARY

In summary, one aspect provides a device, including: a display including a stand including electrical connections; and a base including a memory device, a processor, and a power source; wherein the base is electrically couplable to the display via at least the electrical connections.

Another aspect provides a device, including: a display including a stand located on a back surface of the display and including electrical connections; and a base including a memory device, a processor, and a power source; wherein the base is couplable to the display via the stand and electrically couplable to the display via the electrical connections; wherein the display is rotatable with respect to the base to change an orientation of the display with respect to the base; and wherein, when the display is coupled to the base, the base and display are free-standing.

A further aspect provides a device, including: a base for holding a display device, wherein the base includes a memory device, a processor, and a power source; wherein the base is shaped to be free-standing; wherein the base includes a recess for holding a stand of the display device; wherein the base includes a plurality of ports; and wherein the base includes a cavity, wherein the cavity includes a wireless charging mechanism.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
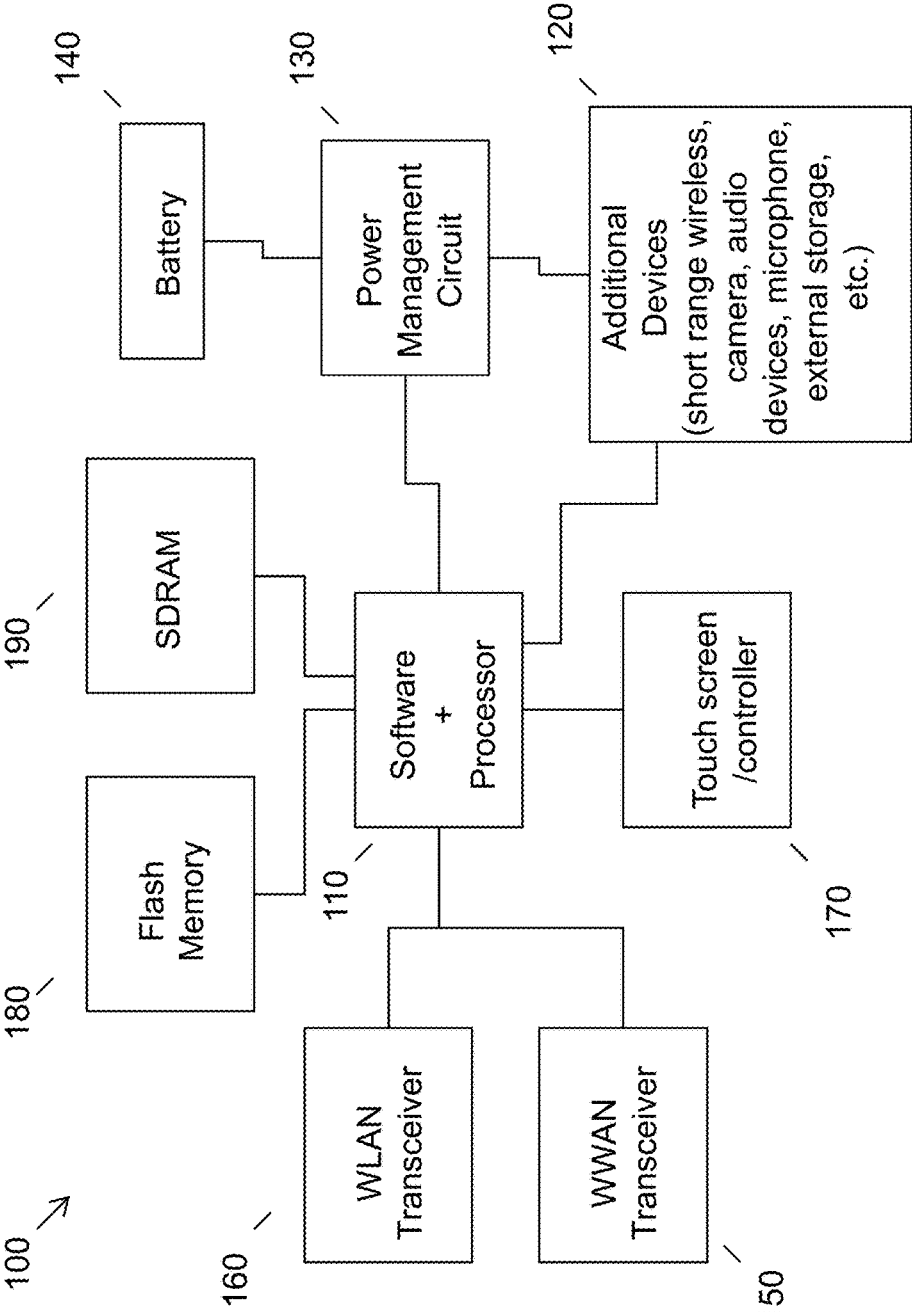
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A compact, portable, information handling device, for example, a laptop, a tablet, a smart phone, and/or the like, have modernized a personal computer and its use. Reducing the size of components required for device operation, permits easy transport of these modern, compact devices. A device's ability to be carried and/or packed, for example, into a backpack, a brief case, a suitcase, and/or the like, provides a level of convenience to a user that is not possible utilizing a traditional desktop computer. Conventionally, a personal computer consisted of multiple standalone components, and moving such components would be nuisance, to say the least. A traditional personal computer (PC) system includes a display, a tower housing hardware, and external components (e.g., keyboard, mouse, trackpads, etc.). To transport this setup would require the disconnecting and individual transport of each component if a user desires to relocate the PC. Also, such components may be heavy, causing stress on the user. For example, a tower housing all the hardware for a PC can be too heavy for some users to lift.

As technology moves forward and compact information handling devices become more common, transporting a device has become easier on a user. These portable devices include all components in a single, inclusive, form factor. Lighter-weight devices allow a majority of users to transport a device with ease, and further permits a user to change an environment when they are using a compact device. For example, a user utilizing a laptop can travel on an airplane to a different city without any issue. Additionally, or alternatively, for example, a user utilizing a tablet can carry a tablet in their hands along with additional materials (e.g., notebooks, folder, etc.) without strain. Compacting the size of an information handling device to a point for easy transport has provided users with a freedom to move about environments without issue.

However, with the compaction comes a decrease in all components of a device, including those in which a user may not wish to have decreased. For example, a user that is accustomed to using a large display to perform a task can dislike a smaller display size present on a laptop and/or a tablet. Additionally, or alternatively, for example, a user that prefers a full-size keyboard may not type as fast and/or have issues when utilizing a compact or soft keyboard. Therefore, the decrease in the size of an information handling device can promote easier transport, but may have a largely negative influence on the ergonomics surrounding the use of a device.

Further, a transition to a more compact device reduces an area within a device that can be utilized for processing resources, thereby influencing the operation and performance of a device. For example, an amount of random-access memory (RAM) present in a device may decrease because the component that houses RAM (e.g., a hard drive) may be smaller than in a traditional PC because of the available space within a compact device. Additionally, or alternatively, upgrades to components within a device may not permitted because of a designed size of a compact device, therefore, requiring a use of the compact device as-is. Thus, what is needed is a device that permits easy transport for a user while not compromising processing power and user preference or ergonomic design.

Accordingly, the described system and method provides a mobile all-in-one device that may be moved about an environment with ease while maintaining the ability for a user to utilize desired components (e.g., desired display, desired input devices, etc.). This mobile all-in-one (AIO) device comprises a display and base that are electrically coupled to one another, that may be orientated in a variety of ways and is light weight. The display of the described device includes a stand for orientating the display about the AIO system aligned with the preference of the user. The base of the described device houses a memory device, a processor, and a power source, while maintaining a weight, permitting easy transport. Additionally, or alternatively, the base may include a variety of ports that may allow for the connection of additional external components and/or the updating/upgrading of internal device components without issue.

The mobile AIO device encourages an ergonomic design that when in use, reduces the change that a user will strain themselves. Additionally, the AIO device allows the user to utilize preferred components while still maintaining a portable device form factor. The AIO device allows for the display to be removed from the base when a user wants to use it in that configuration, but also allows the display to be coupled to the base when the user may prefer to use such a configuration or when the user is moving the device. The AIO form factor ensure that all the components that a user may want to use are stored with the device and also provides easy connection between the base and the display, either with the display being physically coupled to the base or coupled using a single connection. When a user desires to move the mobile AIO device, physically coupling a display to a base permits a user to move about an environment without the need of multiple trips, disconnection and reconnection of multiple wires and cables, and the ability to carry the whole device with a single hand. Thus, the described device provides the convenience of traditional portable information handling device and the configurations and processing capabilities of traditional stationary devices.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
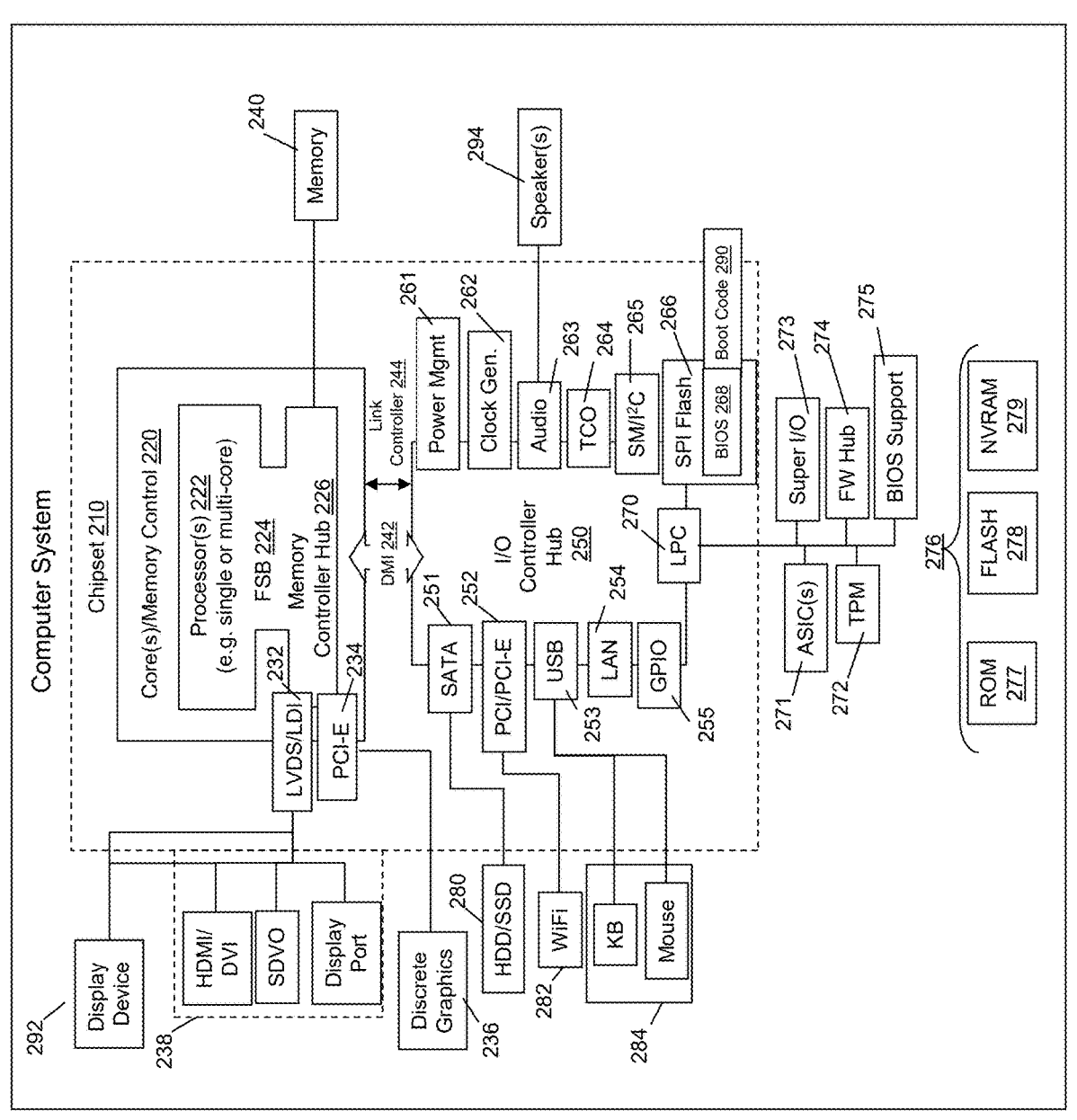
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be a part of the described system and device. Additionally, some of the circuitry described in connection with FIG. 1 and/or FIG. 2 may be utilized within the described system and device. For example, the circuitry outlined in FIG. 1 may be implemented in a tablet or smart phone embodiment, whereas the circuitry outlined in FIG. 2 may be implemented in a personal computer embodiment.

Figure 3:
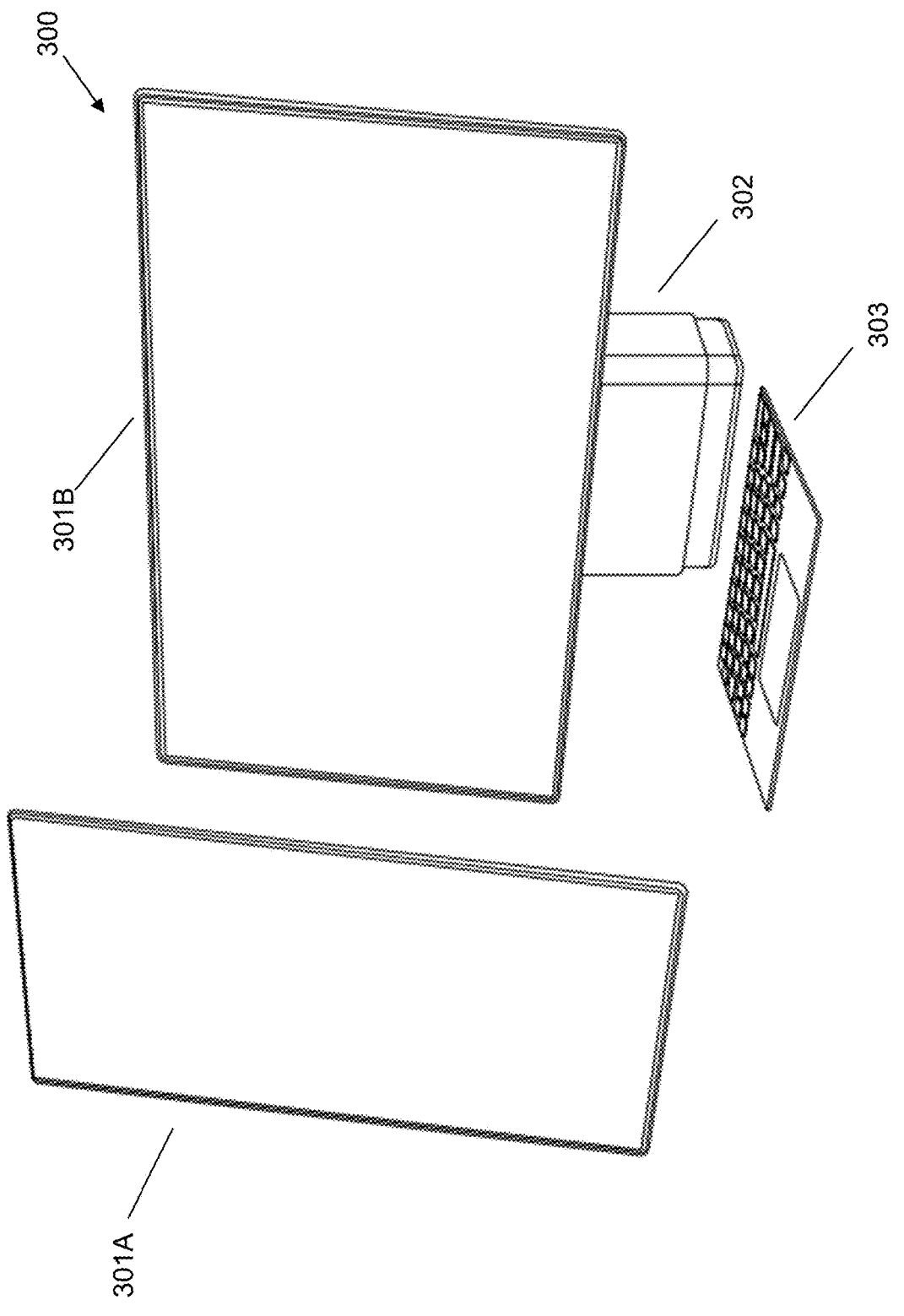
FIG. 3 illustrates an example configuration a mobile all-in-one device.

FIG. 3 illustrates an example configuration of the mobile all-in-one (AIO) device. While the system may include known hardware and software components and/or hardware and software components developed in the future, the device itself is specifically designed as a portable AIO system that allows a user to utilize preferred components. Additionally, the mobile AIO 300 device includes components, modules, and features that are unique to the described system. Each all-in-one device includes at least a display 301A and 301B and base 302. A display, as understood traditionally, provides an output device that displays data. Though a display in such an all-in-one device may be primarily utilized for viewing information, this is intended as being non-limiting. For example, displays that may receive input directly on them (e.g., touch input displays) may also be utilized within the system. The display of the mobile all-in-one system can be manipulated to be oriented in different orientations as per the preference of the user, for example, a portrait orientation 301A, a landscape orientation 301B, or other orientations therebetween.

The base 302 of the mobile all-in-one device 300 may include the components of the device that provide the processing and functional capabilities of the device 300. Specifically, the base 302 may include traditional components to successfully operate (e.g., processor(s), hard drive(s), data storage device(s), motherboard(s), memory, communication device(s) (e.g., wireless communication devices, wired communication devices, short range communication devices, etc.), sensors (e.g. proximity sensors, biometric scanners, gyroscopes, accelerometers, etc.), audio input/output devices, image capture device(s), etc.), as well as additional components that may not be found in traditional devices. Some of the components may additionally, or alternatively, be located on the display of the device 300. The device 300 may also include other components, for example, a keyboard 303, mouse, other input devices, and/or any other components that may be utilized with an information handling device.

The base 302 of the mobile all-in-one device may include additional components, ports, and/or connections that permit successful operation of the device. One of these components includes a power source that can be used to power the base and the display. Similar to traditional central processing units, a mobile all-in-one device may perform tasks in ways that user is familiar with. However, since this is a mobile device, the system may primarily operate with respect to a power source present within a base, for example, powered by a battery. The battery may be a rechargeable battery that can be charged routinely. The battery can be used to power the device when the device is not plugged into a consistent power source, for example, an A/C power source. However, other power sources may be utilized to power the base, for example, components and connections that allow the base to be powered via the A/C power source, solar panels and corresponding components, and/or the like. The base may also include multiple power sources and corresponding components, thereby allowing the device to be powered using one or more power sources at the same time or at different times.

As illustrated in FIG. 3, the display 301A or 301B is connected to the base 302. The base 302 is designed so that when the display 301A or 301B is coupled to the base 302, the device 300 is free-standing. While the display in the portrait orientation 301A illustrated not connected to the base 302, it should be understood that the display can be oriented in any orientation, including the portrait orientation 301A and the landscape orientation 301B. Specifically, the display includes a pivot mechanism that allows for the rotation of the display while it is coupled to the base 302, as discussed in more detail further herein. The display may include a stand that is pivotable about an axis located along a back surface of the display. Therefore, when adjusting from a portrait orientation 301A to a landscape orientation 301B, the display may pivot about this axis. The pivot axis may be located anywhere on the back of the display, for example, the center of the display, at an offset location of the display, and/or the like. The location of the pivot axis may be designed to allow the display to rotate about this pivot axis without touching a surface that the base and/or display is located upon.

The coupling of the display to the base results in a free-standing device that aligns the display at a location on a surface similar to a traditional display having a stand. Additionally, the display may include components or mechanisms that allow for adjustment of the display and the position of the display with respect to the base including, but not limited to, a tilt of the display, an orientation of the display, a height of the display, and/or the like. As the display is adjusted or manipulated, the display may include sensors that can detect the orientation of the display so that the information displayed on the display can be adjusted or moved to correspond to the position, orientation, and/or location of the display which may include the position of the display with respect to the base.

Figures 4A, 4B, 4C:
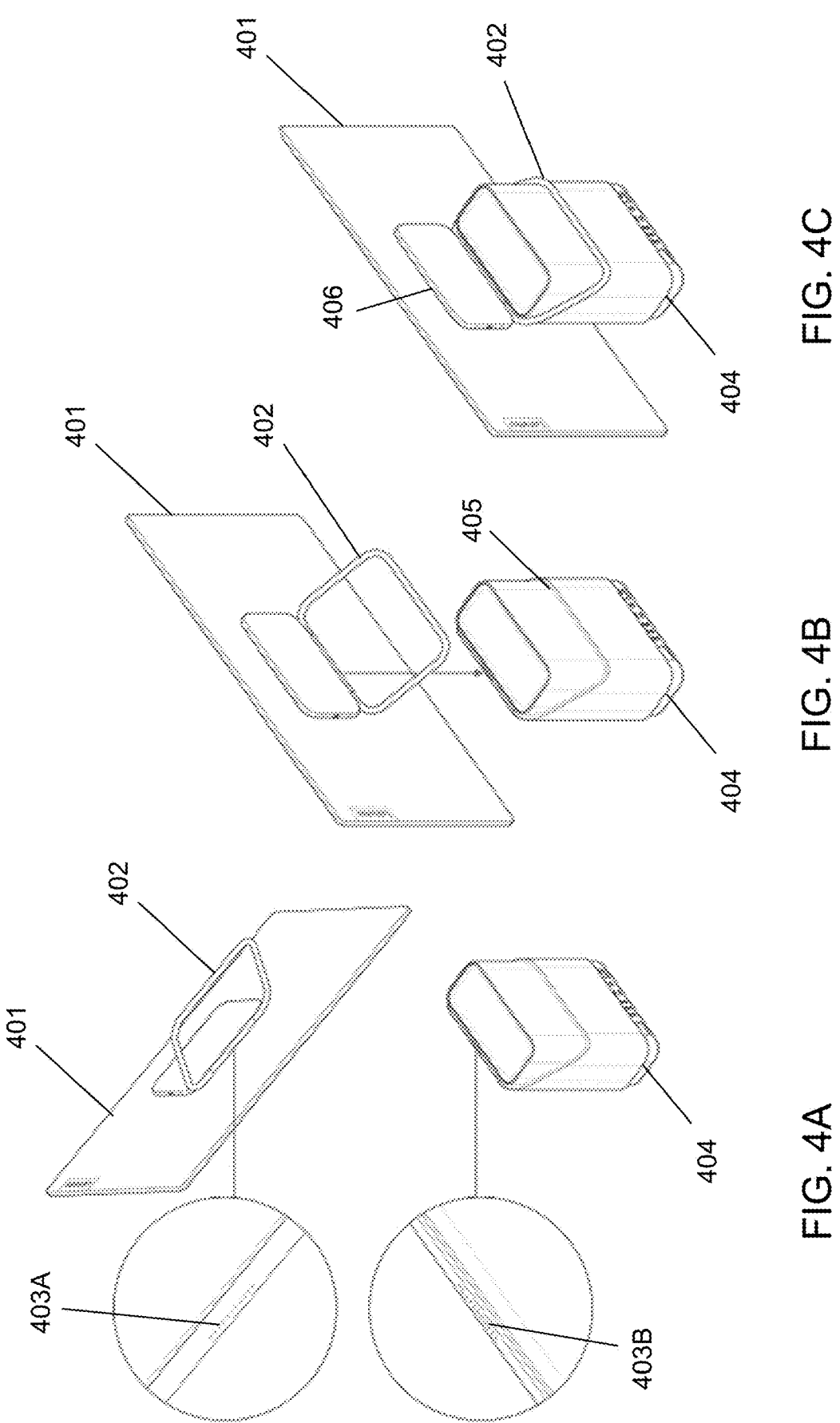
FIG. 4A illustrates an example of the display and the base of the described system separated from each other and enlarged figures of example electrical connections.
FIG. 4B illustrates an example of the positioning of the display to be attached to the base.
FIG. 4C illustrates an example of the display connected to the base.

In order to physically couple a display and a base together, the device may include a coupling mechanism. FIG. 4A-FIG. 4C illustrate an example of physically coupling the display 401 to the base 404. In FIG. 4A, the display 401 and base 404 are separated. In FIG. 4B, the display 401 is positioned over the base 404, so that the stand 402 can be placed in the complementary position on the base 404. FIG. 4C illustrates the display 401 physically coupled to the base 404 and illustrates that that the system or device is a free-standing device when the display 401 is physically coupled to the base 404.

As illustrated in FIG. 4A-FIG. 4C, the coupling mechanism may include a stand 402 located on a back surface of the display 401. The stand may connect to the base 404 of the mobile AIO device. Referring to FIG. 4A, a back surface of the display 401 showing the stand 402 is illustrated. The stand 402 illustrated in FIG. 4A-4C has a rectangular shape. However, this shape is not strictly required as any shape can be utilized, particularly a shape that matches or complements the shape of the base 404. In other words, if the base 404 is a circular shape, the stand may also be a circular shape. As illustrated in FIG. 4A-4C, the stand is connected to the back of the display, and, specifically, to a rear housing 406 of the display. The rear housing 406 may include the pivot mechanism that allows the display to be rotated to change the orientation of the display. While a rear housing is illustrated and discussed, this component is not strictly necessary and, instead, the stand could be directly connected to the back of the display.

The stand 402 may be connected to the rear housing 406, or directly to the display, and include a hinge portion. This hinge portion allows for the stand 402 to be moved with respect to the display 401. In other words, the hinge portion allows for the stand to be moved fore and aft with respect to the display, thereby changing a tilt position of the display. The stand 402 can be positioned to fit over the base 404, thereby coupling the display 401 to the base 404 via the stand 402. The base may include an indent or recess 405 that holds the stand 402 in place when the stand 402 is positioned on and coupled to the base 404. In the example of FIG. 4A-4C, the recess 405 extends around the base 404, but follows a shape of the stand 402, meaning the recess 405 is lower at a back face of the base 404 as compared to the location of the recess 405 at the front face of the base 404. However, this is not strictly necessary as the recess could be at the same level all the around the base, could vary in levels around the base, and/or the like. The recess 405 may also include clips, tabs, fasteners, or other holding mechanisms that may hold the stand 402 when it is coupled to the base 404 to assist in preventing the stand 402 from falling off the base 404.

The physical coupling of the display 401 to the base 404 via the stand 402 may also electrically couple the display 401 and base 404. The stand 402 may include half of an electrical component or connection 403A. The base 404 may include the other half of the electrical component or connection 403B. As an example, the electrical connection component 403A of the stand 402 may include, for example, the male portions of a pogo pin connection and the electrical connection portion 403B of the base may be the female portions of a pogo pin connection. However, this is not the only type of electrical connection component that can be utilized as any type of electrical connector can be utilized. The electrical connection components 403A and 403B may be located on the stand 402 and base 404 in complementary locations so that when the display is physically coupled to the base, the electrical connections are also aligned and coupled, thereby completing the electrical circuit between the display and base. Upon physically coupling the display to the base, the mobile AIO device may stand without the need of support and/or additional assistance. In the system, the shape of the base promotes this free-standing AIO device regardless of the orientation of the display. Thus, the base may be designed to be of a weight, or have a center of gravity, that can support the display without toppling over when the display is physically coupled to the base.

Figure 5:
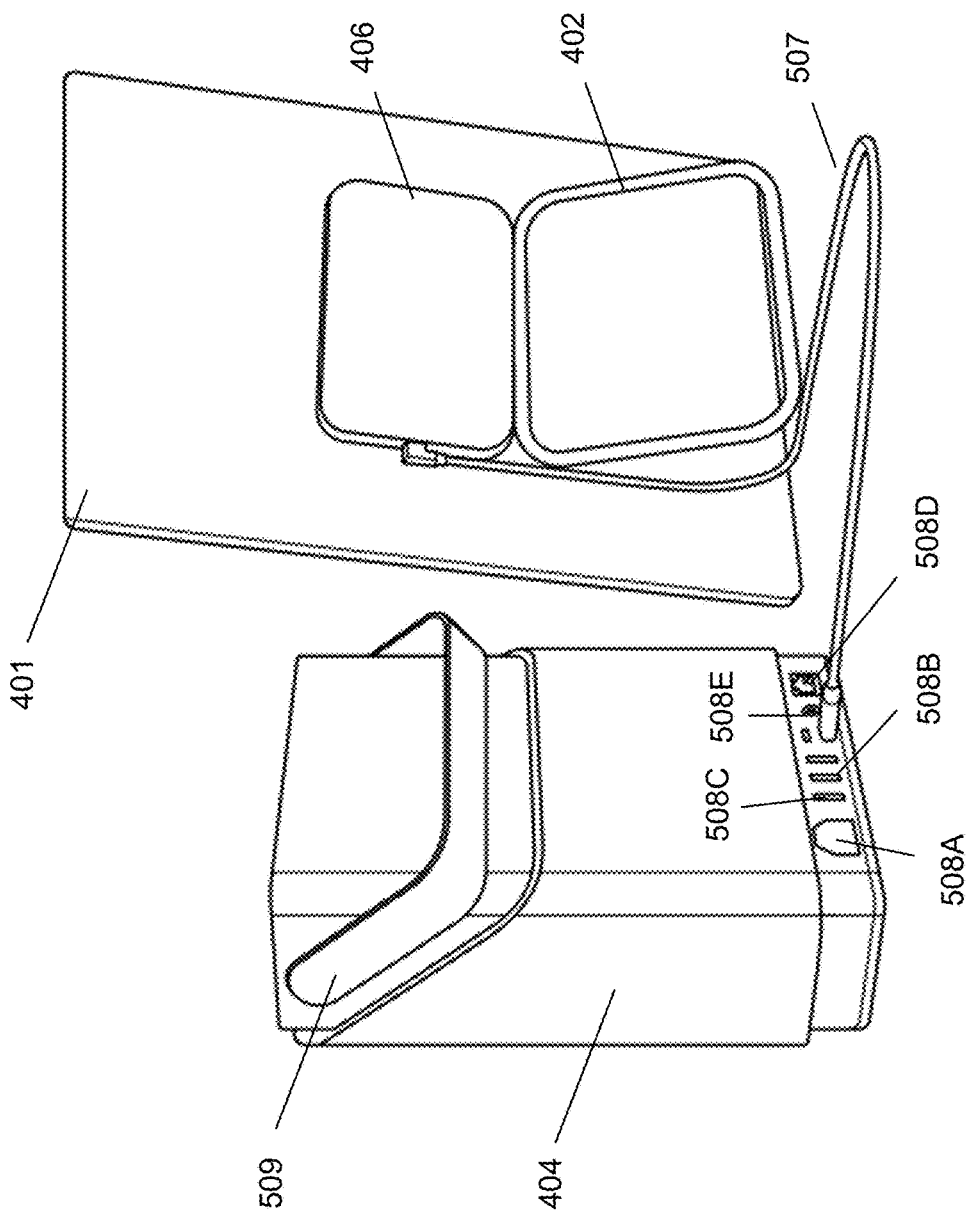
FIG. 5 illustrates mobile all-in-one device that includes a display supporting itself separately from a base

While the device can be utilized with the display physically coupled to the base, the device can also be utilized with the display not physically coupled to the base, as illustrated in FIG. 5. FIG. 5 depicts a mobile all-in-one device where the display 401 is supporting itself separately from a base 404 via the stand 402. As can be seen in FIG. 5, the stand 402 is now acting in support of the display, rather that assisting in physically coupling the display 401 to the base 404, as shown in FIG. 4C. Since the display 401 is no longer physically coupled to the base 404, different electrical connections are required to electrically couple the display 401 to the base 404. In this configuration, an electrical connection cable 507 acts as the electrical connection or coupling point between the display and the base.

Even when the display 401 is separated from the base 404, the orientation of the display 401 can be modified. The same pivot mechanism of the rear housing 406 allows the display 401 to be pivoted with respect to the stand 402, thus allowing for manipulating the display between portrait and landscape orientation. In other words, the portrait display orientation illustrated in FIG. 5, the stand orientation has been pivotally adjusted 90 degrees from a landscape orientation to the portrait orientation. This pivotable adjustment occurs about a pivot axis of the display and with respect to the stand. Additionally, or alternatively, the degree in which the leg of the stand protrudes outward from the back surface of the display may also be adjusted based on user preference. The greater the angle of the leg, the greater the angle at the viewing surface of the display. In other words, the tilt of the display can be modified. Other characteristics can also be modified with additional components. For example, the stand could include a telescoping component that could allow for the height of the display to be adjusted either when the display is physically coupled or physically uncoupled from the display.

FIG. 5 also illustrates additional ports 508A-E that are located on the base 404. Some of these additional ports 508A-E may permit the connection of external devices to the mobile AIO device. Additionally, of these additional ports, power port 508A may be present on each base of a mobile AIO device. Power port 508A acts as port that may be connected to a power source. Connection of the power port 508A to a source may assist in powering the mobile AIO device in a traditional manner. For example, a user may run a power cord from power port 508A to an outlet, and allow the power being provided from the outlet to power the mobile AIO device. Additionally, or alternatively, when power port 508A is connected to a source, the battery present within the base may be charged. As mentioned previously, since the device disclosed herein is a mobile AIO device, a system may operate without the need of being continually connected to a power source aside from the battery present within the base. Therefore, upon connection of a base to a power source via connection through power port 508A, a battery may be charged to allow for operation of the mobile AIO device.

Additionally, or alternatively, in the system, connection of the base to a power source through power port 508A may result in supplementing the battery power needed while the system is in operation. Rather than solely relying on the power provided from an external source and/or the battery present within the base of the system, connection through the power port 508A may allow a smaller portion of power required for the system to operate to come from the battery, therefore preserving a battery. When the mobile AIO device determines that a battery is fully charged while the base is still connected to an external power source through power port 508A, the system may run solely on the power being provided from the external source to prevent the battery in the device from overcharging and damaging the battery.

In addition to the power port 508A, the base of a mobile AIO device may include at least one of a universal series bus (USB) port 508B, a high-definition multimedia interface (HDMI) port 508C, an ethernet port 508D, and an auxiliary jack port 508E. The USB port 508B may be of any type of bus port that may perform as at least one of an input and an output. The HDMI port 508C may act as an output connection from the base to an additional display, for example, a monitor used for presentation. The ethernet port 508D may act as an input for connection to a wired network (e.g., an internet connection, wired home or business network, etc.) when a wireless connection is not available and/or is weak. The auxiliary jack port 508E may be at least one of an output port and an input port, an output port for providing media to an external device (e.g., outputting music to a stereo, outputting sound to headphones, etc.) and/or an input port for capturing media (e.g., receiving audio input from a microphone). The listing of these additional ports present on the base are intended to be non-limiting. In other words, a base may include additional port types, fewer port types, and/or may not include any additional ports whatsoever. Additionally, some of the described ports, or other port types, may be included on the display.

Additionally, FIG. 5 includes an illustration of a handle 509 located on the base 404. Since the system is described as being mobile and light weight, the handle 509 provides a component for carrying the device with ease. Rather that requiring a user to use two-hands when carrying each component of a device as is required in traditional methods, the handle 509 allows a user to carry a mobile AIO device using one hand. The handle may rotate about an axis at a connection point at the base of the mobile AIO device. The handle 509 may rotate upwards so that a user may carry the device in a common position (e.g., similar to carrying a brief case). When the display 401 and base 404 are physically coupled together, as illustrated in FIG. 3, a user may carry the entire mobile AIO device with one hand via the handle 509. Additionally, or alternatively, when the display is standing independently of the base, a user may elect to carry the base by the handle in one hand while carrying the display in the other. Alternatively, a user may elect to disconnect a display from the base to make the device even lighter. Regardless of a user's preference in carrying the mobile AIO device components, the handle 509 permits easy carrying of the base or the coupled mobile AIO device.

Figure 6:
FIG. 6 illustrates a display in an orientation separate from the base and with a flatter orientation.

In addition to providing a device that may be moved with ease, a mobile AIO device is also designed to promote positive ergonomic design. When the display of the mobile AIO device is physically coupled to the base an eyeline of a user may be directed to a display in a comfortable position. Additionally, the display may be coupled to the base at a height and in a manner that encourages correct posture of a user when utilizing the mobile AIO device. To further illustrate the positive ergonomic design of the mobile AIO device, FIG. 6 provides an illustration of a display in an orientation separate from the base, and with a flatter orientation. In the previous descriptions of the device orientation, the display is positioned in a way that may resemble a traditional computer system.

FIG. 6, on the other hand, illustrates a potential orientation of the display that may be seen as non-traditional, but still promotes positive ergonomics when in use. Since many users utilize touch screen displays (i.e., displays that allow input directly onto the display either via a stylus, finger, or other input device), the described AIO device allows the display to be positioned in an orientation that makes the use of a touch screen more comfortable and ergonomic. The stand located on the back surface of a display includes a hinge mechanism that allows for the modification of the angle of the display with respect to the stand, thereby changing a tilt of the display. In the previous examples, this angle was depicted as an acute angle at the hinge portion and with respect to the display that positioned the display in a more upright position.

As can be seen in FIG. 6, the stand is at an obtuse angle at the hinge portion and with respect to the display, providing a user with a flatter, more surface-like orientation of the display, which may be easier to use when utilizing the touch surface features of a display or when viewing a display from a more overhead position. As is present in FIG. 6, the figure shows a user providing input directly to a display with a stylus. Positioning a display at such an angle may promote positive ergonomic design for providing an input directly on the display, for example, drawing input. Once again, the position and orientation of the display in FIG. 6 is intended as being non-limiting, and a user may orientate a display however they feel most comfortable.

Figure 7:
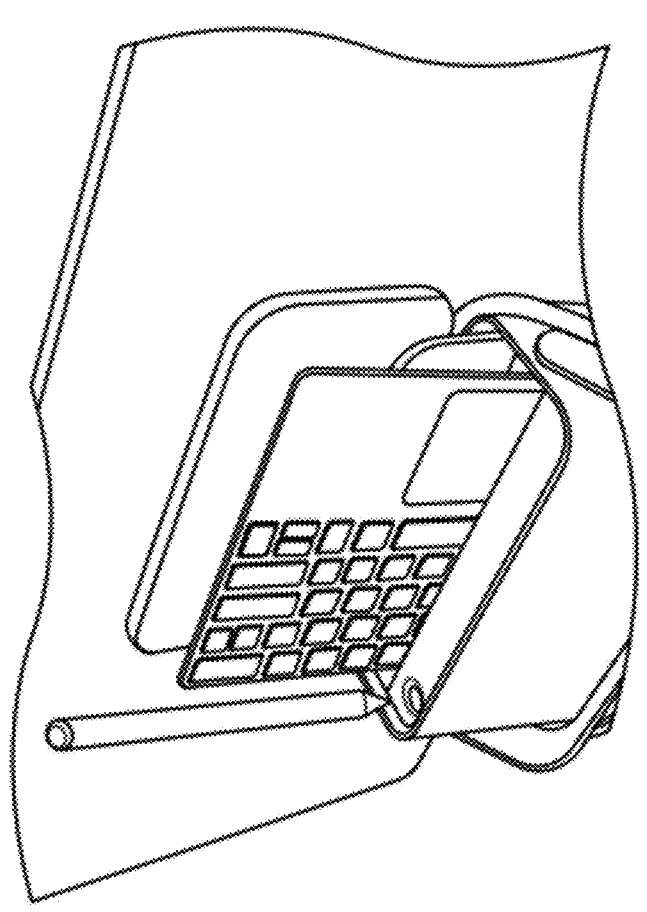
FIG. 7 illustrates a cavity of a base of a mobile all-in-one device.

Additionally, the base may include a cavity located within the base or a cavity located on an outer portion of the base, like a pocket-type configuration. The cavity may be utilized to house external device components, for example, a keyboard, a mouse, a stylus, a trackpad, the wired connection cable, other cables, and/or the like. The cavity may be located along the side of the base. In the example of FIG. 7, the cavity may be located at the top of the base. The base may also include multiple cavities, for example, one located within the base, one located on a side of the base, and/or the like. Additionally, as illustrated in FIG. 7, the cavity may be divided to delineate multiple cavity portions.

FIG. 7 illustrates multiple external device components located within a cavity located at the top of a base of a mobile AIO device. As can be seen in FIG. 7, these external device components extend outside of the cavity. This is for illustrative purposes only as the components may stick out of the cavity or may be fully housed within the cavity. Additionally, the cavity may include additional functionality, for example, a wireless charging mechanism. A wireless charging mechanism may permit the charging of at least one external device component present within the cavity, thereby allowing the external device components to be partially or fully charged upon removal from the cavity. Additionally, or alternatively, the wireless charging an external device component may permit the use of an external device component that does not require a wired input to power the component. Rather, an external device component may remain paired with a device, and upon detection of the external device component after removal from the cavity, the system may recognize the presence of the external device component in relation to the mobile all-in-one device. Further, the wireless charging mechanism may be powered by the power source of the mobile all-in-one device. These outlined uses of a cavity and the associated external device components are intended to be non-limiting, and a mobile AIO device may operate with any type of external device component and other components or objects may be stored within the cavity. For example, a user may utilize the cavity to store personal items such as a cell phone, food, drink, book, writing tablet, and/or the like.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device, comprising:
   a display comprising a stand comprising electrical connections; and
   a base comprising a memory device, a processor, and a power source;
   wherein the base comprises a cavity; and
   wherein the base is electrically couplable to the display via at least the electrical connections.

2. The device of claim 1, wherein the base is physically couplable to the display stand.

3. The device of claim 1, wherein the base is shaped to hold the display such that the base and display, when coupled to the base, are free-standing.

4. The device of claim 1, wherein the base comprises a plurality of ports; and wherein the plurality of ports comprises a power port and at least one of: a universal series bus port, a high-definition multimedia interface port, an ethernet port, and an auxiliary jack port.

5. The device of claim 1, wherein the cavity comprises a charging mechanism.

6. The device of claim 1, wherein the base comprises a handle located at a top portion of the base.

7. The device of claim 1, wherein the stand is located on a back surface of the display.

8. The device of claim 7, wherein the base is located on a side opposite a display side of the display when coupled to the display via the stand.

9. The device of claim 1, wherein the base is electrically coupled to the display via a cable.

10. The device of claim 1, wherein the stand is pivotable to adjust an orientation of the display.

11. The device of claim 1, wherein the display comprises a pivot mechanism and wherein the display is pivotable around the pivot mechanism to change an orientation of the display.

12. A device, comprising:

a display comprising a stand located on a back surface of the display and comprising electrical connections; and a base comprising a memory device, a processor, and a power source;

wherein the base is couplable to the display via the stand and electrically couplable to the display via the electrical connections;

wherein the display is rotatable with respect to the base to change an orientation of the display with respect to the base; and wherein, when the display is coupled to the base, the base and display are free- standing.

13. The device of claim 12, wherein the base comprises a cavity.

14. The device of claim 13, wherein the cavity comprises a wireless charging mechanism.

15. The device of claim 12, wherein the base comprises a handle located at a top portion of the base.

16. The device of claim 12, wherein the base is located on a side opposite a display side of the display when coupled to the display via the stand.

17. The device of claim 12, wherein the base is electrically coupled to the display via a cable.

18. The device of claim 12, wherein the stand is pivotable to adjust an orientation of the display.

19. A device, comprising:

a base for holding a display device, wherein the base comprises a memory device, a processor, and a power source;

wherein the base is shaped to be free-standing;

wherein the base comprises a recess for holding a stand of the display device;

wherein the base comprises a plurality of ports; and wherein the base comprises a cavity, wherein the cavity comprises a wireless charging mechanism.

* * * * *